(12) United States Patent
Niedermeyer

(10) Patent No.: US 6,807,963 B1
(45) Date of Patent: Oct. 26, 2004

(54) SOLAR COLLECTOR FOR HEATING AIR

(76) Inventor: William P. Niedermeyer, 1024 Mt. Mary Dr., Green Bay, WI (US) 54311

( * ) Notice: Subject to any disclaimer, the term of this patent is extended or adjusted under 35 U.S.C. 154(b) by 0 days.

(21) Appl. No.: 10/712,088

(22) Filed: Nov. 14, 2003

(51) Int. Cl.$^7$ .................................................. F24J 2/24
(52) U.S. Cl. ........................ 126/628; 126/651; 126/667; 126/704
(58) Field of Search .................................. 126/628, 629, 126/633, 651, 663, 704, 705, 710, 658

(56) References Cited

U.S. PATENT DOCUMENTS

| | | | | |
|---|---|---|---|---|
| 4,120,283 A | * | 10/1978 | Eder | 126/665 |
| 4,265,221 A | * | 5/1981 | Whinnery | 126/591 |
| 4,316,452 A | * | 2/1982 | Levine | 126/664 |
| 4,360,006 A | * | 11/1982 | Warnock | 126/674 |
| 4,426,997 A | * | 1/1984 | Bette et al. | 126/667 |
| 4,471,761 A | * | 9/1984 | Pearson et al. | 126/628 |
| 4,498,458 A | * | 2/1985 | Soper | 126/628 |

* cited by examiner

Primary Examiner—James C. Yeung

(57) ABSTRACT

A solar heat collector constructed of non-conducting laminated and corrugated material to form a collector container with a bottom panel, a plurality of end panels that include a plurality of attached plenums with air inlet and exiting apertures and distribution apertures for air flow over and under an absorber plate. A plurality of side panels include longitudinally folded supports for an absorber plate held in place by bonding attachment to longitudinal side and underlying center supports extending upward from the bottom panel. The conductive absorber plate is positioned vertically to allow air flow space between the plate and a cover and air flow space below the plate parallel to the centerline. In another embodiment, end and side panels including the end plenums and side supports are co-extensive panels of a common multi-panel blank that is folded to form the container bottom, ends and sides. After assembly of heat collecting parts, the container can be overwrapped in film for waterproofing with air connections added through punctures in the film at field assembly of a collector array. In another embodiment, a third tertiary panel extension from one or both sides of the secondary side panel includes score lines for a folded center support underneath the absorber.

19 Claims, 4 Drawing Sheets

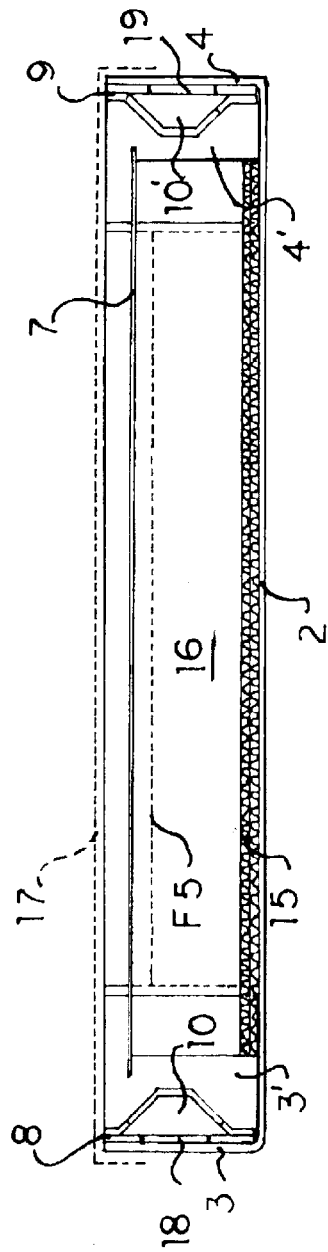
FIG. 2
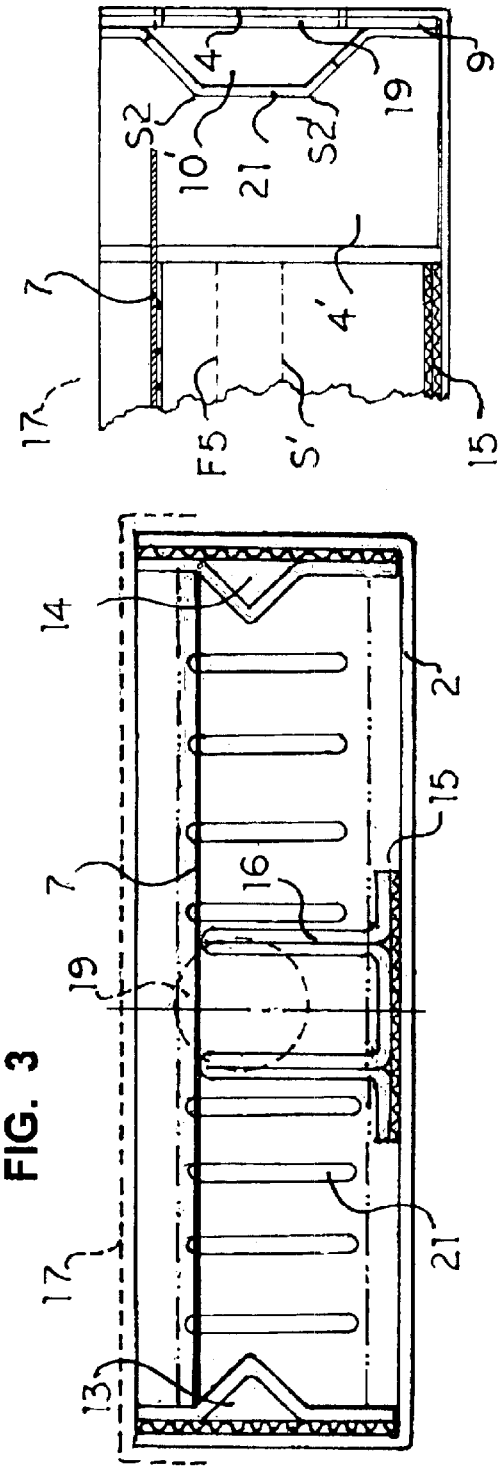
FIG. 4
FIG. 3

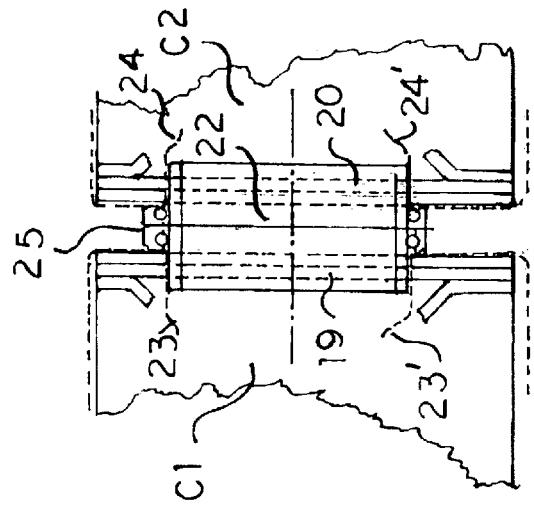
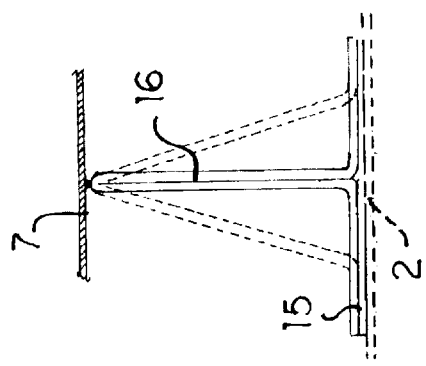
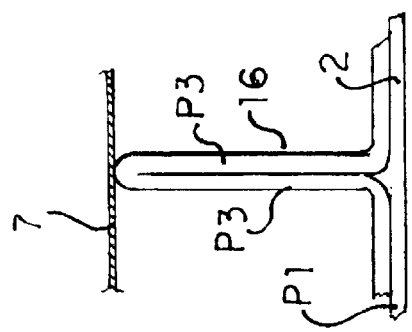
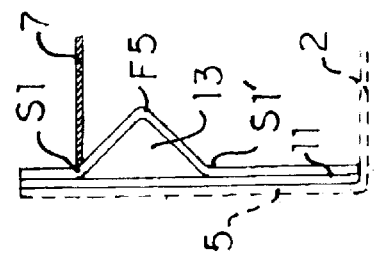
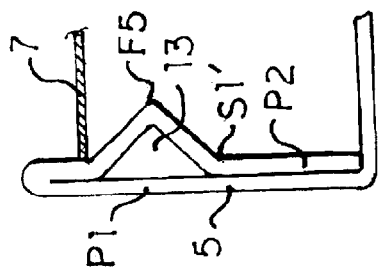

SOLAR COLLECTOR FOR HEATING AIR

BACKROUND AND SUMMARY

Solar collectors for air heating have common elements including a frame with sides and ends, means to support an absorber plate, air channels, inlet and outlet connections, and glazing.

Currently, most collector frames and absorber plates are metallic low carbon steel or aluminum, glazing is single or double glass with sealants or gasketing, all relatively heavy, expensive, and requiring assembly of components not well adapted to high speed processing.

As a result, present solar collectors are costly and not competive with other types of energy.

An abundance of solar data defines solar insolation and absorption (efficiency) for many different collector designs, including variables such as different latitiudes, solar seasonal angles, angles of collector tilt, hours of sunshine, etc.

Given so many variables, there were few consumers who understood solar engineering, especially how to calculate collector system economics, and therein resides the economic failure of solar energy for home use. Solar energy is all about abundant energy, how to collect and utilize it, and how to make solar systems and therms of heat output competitive with other sources.

Solar collectors for residential heating are only part of the installed cost but presently represent a significant portion of the expense.

Current practice involves roof or wall mounting of collectors that are fixed and at proper sun angles for only a portion of the solar year.

Since roofs and wall exist, they were the preferred site for installation of panel collector arrays. Given that existing roof/wall areas were already available, other mounting options were not usually considered, nor were they practical due to the size and weight of current collectors.

Collector efficiency was and is considered to be critical to production of heat despite other major limitations imposed by fixed mounting angles etc. and collector designs included costly components for marginal efficiency increases.

With the inventive collectors using lighter materials and making them easy to connect as an array in a framework remote from a building collectors can now be arranged for optimum solar angles and maximum solar colletion per sq. ft to provide large ares for solar collection and despite the possibilty of lower efficiencies, this invention and solar concepts aim toward greater solar insolation and collection with some potential loss of efficiency.

Together with inexpensive materials produced at speeds over 300 fpm, converted into components and assembled at about 50 panels/min, the inventive panels provide inexpensive supplemental heat at a cost per therm competitive with conventional fuels.

The objective of the invention is to provide solar collectors from material abundantly produced, readily converted with known technology requiring less assembly time, for light weight installation in a framework pivotable along one margin to adust to changing solar seasonal angles.

With the above and other objectives in view, more information and understanding of the invention and its use for supplemental heat may be achieved by reference to the detailed description hereinafter

BRIEF DESCRIPTION OF THE DRAWINGS

FIG. 2 is a sectional side elevation viewed from line 2—2 of FIG. 1 illustrating location of the air plenums and absorber plate with bottom support(s) for longitudinal plate support.

FIG. 3 is a sectional end elevation viewed from 3—3 of FIG. 1 illustrating side and central plate supports and air plenum slots for air distribution.

FIG. 4 is an enlarged partial side elevation similar to FIG. 2—2 as viewed from line 4—4 of FIG. 1 illustrating the relationship of absorber, plenum slot apertures, and air space for flow above and below the absorber.

FIG. 5 is a partial side elevation of one side support viewed from line 5—5 of FIG. 1 illustrating absorber plate support provided by the secondary side panel and inner folded attachment.

FIG. 6 is partial end elevation viewed from line 6—6 of FIG. 1 illustrating one central absorber support and alternate folding for more rigidity (phantom).

FIG. 7 is a sectional end view along sight line 7—7 of FIG. 1 illustrating use of a common conduit connection between adjacent collector panels

FIG. 9 is a sectional side view like FIG. 5 illustrating use of the foilded blank shown in FIG. 8. The interrmediate panel is eliminated to form a double thickness container side.

FIG. 10 is a sectional end view like FIG. 6 illustrating use of the extended panel in FIG. 8 to form the upstanding plate support and resultant double thickness (partial) container bottom.

DETAILED DESCRIPTION

Figure 1:
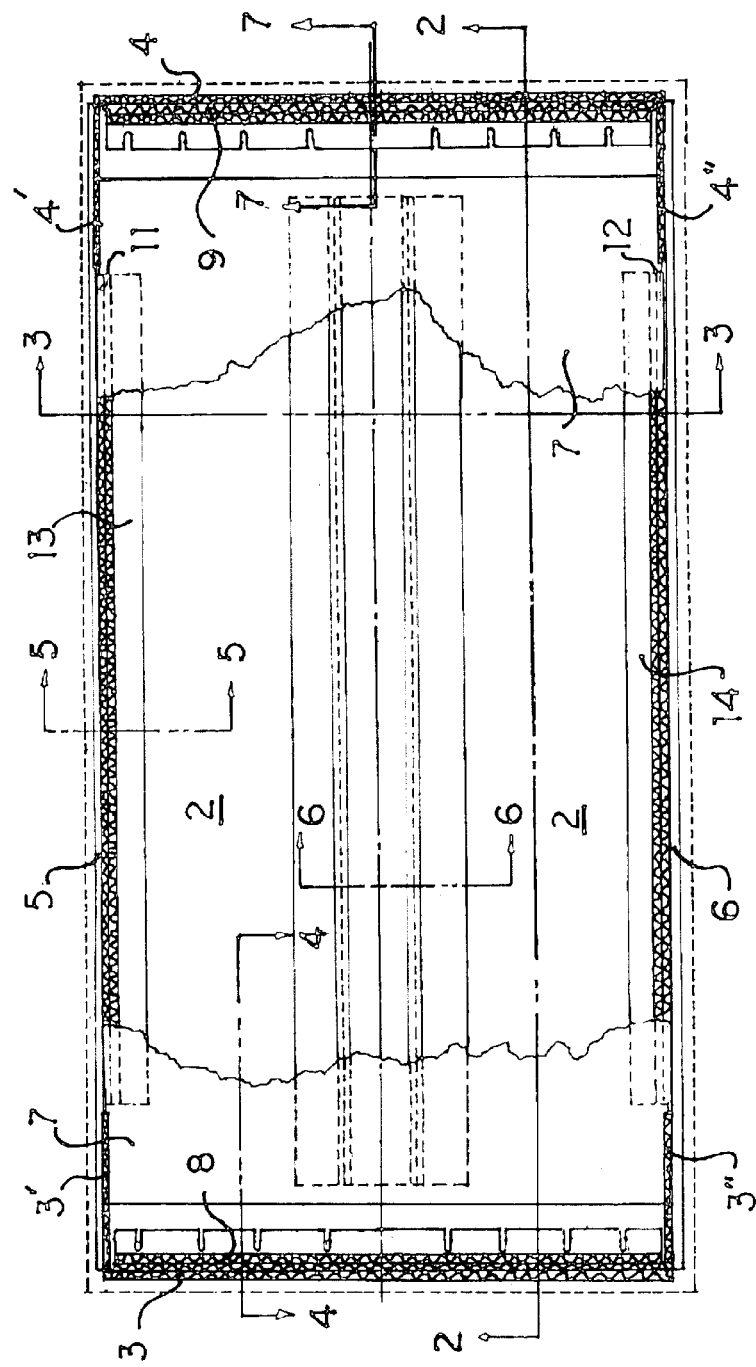
FIG. 1 is a plan view of the instant collector panel illustrating the upfolded end panel with corner folded tabs and side panels to complete the container tray, secondary end panels with air plenums, secondary side panels with plate supports and cutaway portions of the absorber plate. The top cover it shown phantom. Film overwrap not shown.

In FIG. 1, a solar heat collector panel 1 includes a primary main bottom panel 2, two primary end panels 3, 4, and two primary side panels 5,6 shown assembled as an open container.

Before end panels 3, 4 are folded vertically upward, tabs 3' and 3" are folded along a side fold line (see F1–F1' and F2–F2' in FIG. 8) and after the end panels are upfolded to the vertical position, tabs are secured to the respective ends of the side panels 5,6 to complete the container (tray).

In FIG. 2, separately fabricated two-piece secondary end panels 8,9 are placed inside of end panels 3, 4. The surface facing the end panel is secured (preferable adhesive) to the inside of the end panel and the second piece is scored and folded into the shape of plenums 10, 10'.

In FIG. 2, absorber plate 7 is supported by at least one longitudinally oriented vertical support 16 under the central portion of the plate. The absorber plate is bonded to the top of the support.

Plate support 16 is the upraised portion of the two-piece secondary bottom panel 15 secured to the primary bottom panel 2. (see FIG. 6 detail)

Figure 8:
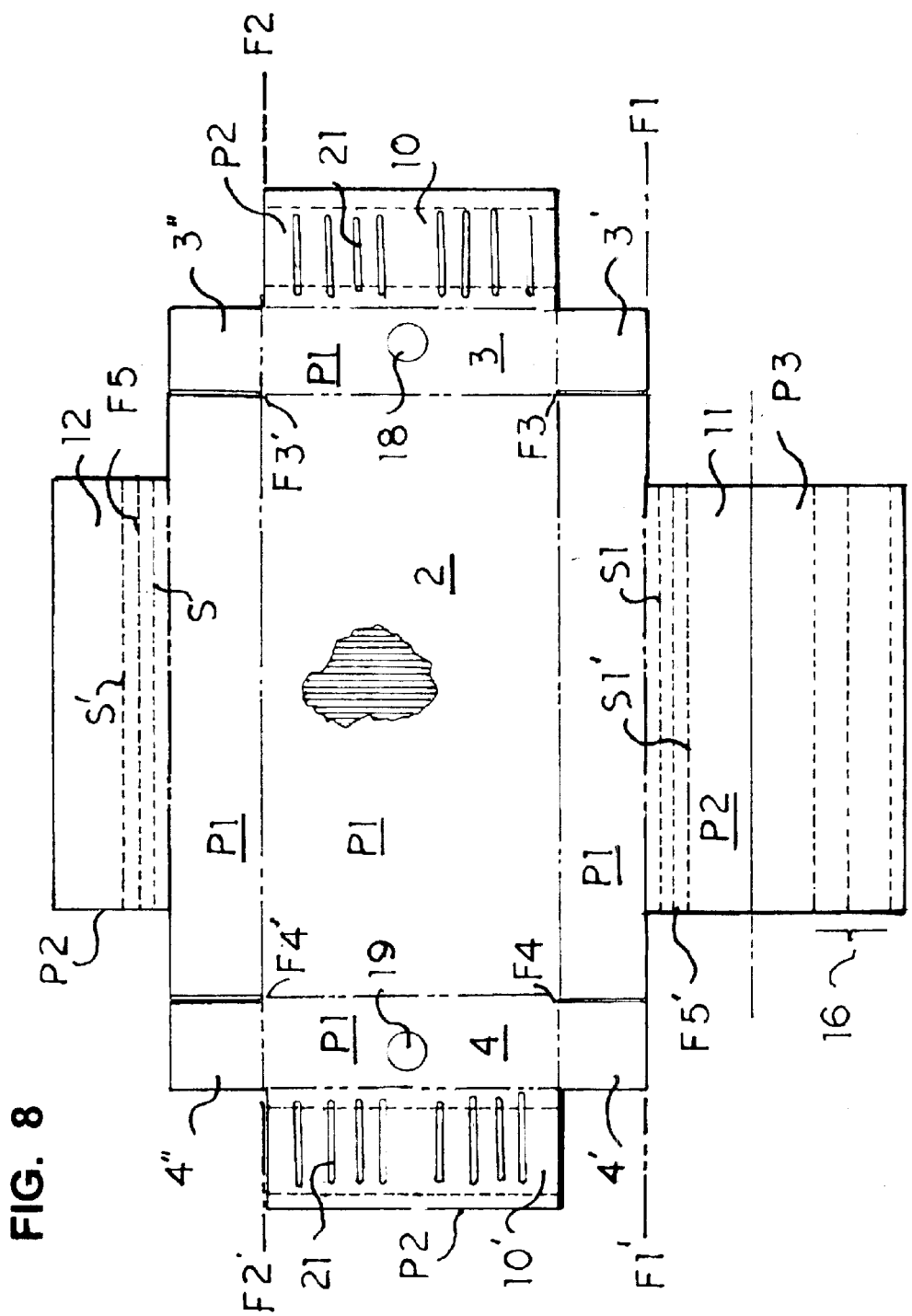
FIG. 8 is a plan view of a corrugated material blank comprising the main bottom panel, connected primary and secondary side and end panels with cutouts, score lines for folding, etc, and an optional third panel extended from a secondary side panel to form a bottom support (only one side shown)

In FIG. 2, an outward fold line F5 on a secondary side panel is behind the vertical support 16 and is shown in phantom. Other adjacent score/fold lines S, S' are seen in FIG. 8. (see also FIG. 5).

In FIGS. 1,2, 3 the collector has a top cover or is wrapped in film to eliminate leakage and windage effects, but film is not shown for clarity (see film portions in FIG. 7 at the inlet and outlet end connections)

In FIGS. 3 and 5, projections 13, 14 on the inside portion of two part secondary side panels 11, 12 support the plate at the sides. Score lines and fold lines for these projections are also shown in FIG. 8 inside the extended side panels P2 of FIG. 8.

In FIG. 3, vertical air distribution slots 21 are arranged symmetrically about the panel centerline and can be positioned or altered for most efficient air flow above and below the absorber and transversely across the inside of the panel.

FIG. 4 is enlarged for clarity and the description for FIG. 2 applies for the right hand end plenum shown. Reference to slots 21 is noted.

FIG. 5 is enlarged for clarity of details shown in FIG. 3 and as described above in FIG. 3. For clarity, the primary bottom (2) and side panels (5) are shown in phantom to more clearly show the two part secondary panel 11 which forms the side projection 13.

FIG. 6 is enlarged from FIG. 3 and is described above. In FIG. 6 flat bottom panel 2 is in phantom to more clearly show the two part secondary bottom panel 15 bonded together to form a vertical absorber plate support 16. For rigidity, another embodiment includes a triangular space between upstanding portions 16.

In FIG. 7, two collector panels C1, C2 are overlapped in film for, weatherproofing. In panel C1, a common conduit connector 22 is inserted thru punctured film 23, 23', extends outward from aperture 19 and is inserted through punctured film 24, 24', through (inlet/outlet) aperture 20 of an adjacent panel C2, a gasket with "O" rings seals minute spaces between the film and connector to prevent water leakage to the inside.

In the foregoing description, primary and two-part secondary panels form end and sides three panels thick for maximum insulation with only corrugated material. This is preferred but involves separate fabrication of the secondary inserts.

In FIG. 8, secondary panels P2 are shown as extensions if primary panels P1 and are conected thereto at fold lines F-1, F-2, -3 and F-4. Reference numbers used for 3-part panels heretofore described are the same except for their elimination in the embodiment shown in FIG. 8.

The blank fabricated in FIG. 8 provides the same functions as above, but it is understood that when folded, one part of the secondary panel described above is no longer used and the inner part is folded into side supports or end panel air plenums.

In another embodiment, a tertiary panel P3 is extended from side panel P2 to provide a second thickness of corrugated on the bottom panel and one vertical absorber support 16 extending upward from the bottom. This arrangement applies to both sides having tertiary panels. If necessary (FIG. 8 only shows one tertiary extension for clarity).

In FIG. 9, the first panel P1 forms the side and panel P2 the inside panel with projection side supports.

In FIG. 10, first panel P1 forms the bottom and the tertiary panel P3 is folded over the side, on the bottom and includes vertical plate support 16 as a folded part of panel P3.

It is understood that the present invention may be embodied in other specific forms without departing from the spirit or special attributes hereof, and it is, therefore, desired that the present embodiments be considered in all aspects as illustrative and therfore not restrictive, reference being made to the foregoing description to indicate the scope of the invention.

Having thus described my invention, what I claim as new and desire to protected by Letters Patent are the following:

1. A solar collector panel for heating air comprising:
   a container with a bottom panel, two vertically folded primary end panels, two vertically folded primary side panels and an open top,
   a heat conducting absorber plate with a heat absorbing surface substantially the same width as the bottom panel and a length less than the bottom panel
   a plurality of secondary inner end panels bondably attached to said primary end panels, each forming an air distribution plenum chamber facing inward,
   a plurality of secondary inner side panels bondably attached to said side panels, each of said secondary side panels having an inwardly extending surface to longitudinally support said absorber plate,
   a secondary two-part bottom panel longitudinally folded to form at least one vertical absorber plate support parallel to the centerline of the collector and bondably attached to the bottom panel,
   a transparent cover
   an aperture in each primary end panel for air inlet and outlet conduit connectors.

2. The collector of claim 1 wherein the container includes a non-conducting composite structure comprising an intermediate corrugated portion interspersed between non-corrugated outer pieces.

3. The collector of claim 1 overwrapped in waterproof film wherein air inlet and outlet conduit connectors are each inserted into one aperture of the primary end panel to puncture and penetrate end extensions of the film and force segments of the film inwardly in contact with the outside surface of the conduit.

4. The collector of claim 1 wherein the primary end panels have tab extensions folded upward about the side folding line before being folded 90 degrees about the end fold line and adhesively attached to the side panels to form an open container.

5. The collector of claim 1 wherein said secondary end panels include plenums with vertical air distributor apertures.

6. The collector of claim 1 wherein said secondary inner side panels provide conductor plate supports that are are aligned vertically with the upper surface of one or more supports extending upward from the bottom panel.

7. The collector of claim 1 wherein the absorber plate includes space between the absorber ends and respective end panels.

8. The collector of claim 1 including an air passage above and below the absorber plate.

9. In the collector of claim 1 wherein the absorber plate is supported by said inwardly extending surfaces of the secondary side panels and is positioned for air flow above and below said absorber plate from air inlet to air outlet of the collector.

10. The collector of claim 9 wherein the absorber plate is bondably held in position above said side supports.

11. The collector of claim 1 wherein the inner secondary end and side panels are contiguious extensions of the primary end and side panels and are folded inside the container.

12. In the collector of claim 11 wherein the plurality of secondary inner end panels extended from each end include a plurality of apertures and are folded inside each end to form the air distributing plenum for incoming and exiting air.

13. In a collector of claim 12 wherein said inside wall of said plenum includes an even number of apertures located symmetrically about the horizontal centerline of the collector.

14. In the collector of claim 11 wherein a folded portion of at least one tertiary panel extension of a secondary side panel is bonded to the primary bottom panel and includes a folded support under the absorber plate.

15. In the collector of claim 1 wherein the container is closed with a top cover having end and side extensions.

16. In the collector of claim 1 wherein the collector is overwrapped in transparent fillm.

17. In the collector of claim 1 wherein said inwardly extending surfaces are portions of inwardly folded projections of the secondary inner side panels.

18. In the collector of claim 11 wherein the secondary panels extended from each end include a plurality of apertures and are folded inside of each end to form an air distributing plenum for incoming and exiting air.

19. In a collector of claim 15 wherein said secondary inner end panels forming the air distribution plenum chambers include an even number of apertures located symmetrically about the centerline of the collector.

* * * * *